United States Patent [19]
Ennis, Jr. et al.

[11] Patent Number: 5,521,907
[45] Date of Patent: May 28, 1996

[54] METHOD AND APPARATUS FOR NON-INTRUSIVE MEASUREMENT OF ROUND TRIP DELAY IN COMMUNICATIONS NETWORKS

[75] Inventors: James D. Ennis, Jr., Gaithersburg; John E. Hasselkus, Germantown; Thomas R. Nisbet, Ellicott City; Robert Troutman, Gaithersburg, all of Md.

[73] Assignee: Visual Networks, Inc., Rockville, Md.

[21] Appl. No.: 429,217

[22] Filed: Apr. 25, 1995

[51] Int. Cl.$^6$ ................................................. H04L 12/26
[52] U.S. Cl. ................................................. 370/17; 375/224
[58] Field of Search ..................... 370/13, 17, 15, 370/60, 60.1, 94.1, 94.2, 85.1, 85.2, 85.3, 85.4, 85.5; 375/224

[56] References Cited

U.S. PATENT DOCUMENTS

| | | |
|---|---|---|
| 3,916,379 | 10/1975 | Dulaney et al. |
| 4,710,924 | 12/1987 | Chum. |
| 4,713,810 | 12/1987 | Chum. |
| 4,736,377 | 4/1988 | Bradley et al. |
| 4,920,537 | 4/1990 | Darling et al. |
| 5,371,733 | 12/1994 | Denneau et al. ........................ 370/17 |
| 5,450,394 | 9/1995 | Gruber et al. ........................ 370/17 |
| 5,467,342 | 11/1995 | Logston et al. ........................ 370/17 |

*Primary Examiner*—Wellington Chin

[57] ABSTRACT

Measurement of round-trip delay or travel time in a communications network during in-service operation is accomplished by use of two probes, situated at respective points of interest along the communication network, and a processor. The probes receive identifiable data patterns normally transmitted over the communications network and generate a time stamp when each pattern arrives at or leaves the respective point. Each probe further generates a pattern identifier based on the data in the pattern and stores the identifier and time stamp as a pair in a buffer internal to each probe. Once the internal buffer contents exceed a predetermined amount of data, the processor receives the data from the buffers and matches pattern identifiers between the buffers to locate the departure and arrival time stamps of each pattern traveling between the probe points. Thereafter, the processor calculates an average of round-trip delay or travel times based on the departure and arrival time stamps of several patterns traveling in both directions between the probe points.

24 Claims, 6 Drawing Sheets

METHOD AND APPARATUS FOR NON-INTRUSIVE MEASUREMENT OF ROUND TRIP DELAY IN COMMUNICATIONS NETWORKS

BACKGROUND OF THE INVENTION

1. Technical Field

The present invention pertain to a method and apparatus for measuring round-trip delay or travel time in a communications network while the communications network is in-service.

2. Discussion of the Prior Art

Numerous prior art communications networks send packets of information to target sites. Such networks are typically wide area networks (WAN) and include Frame Relay, ATM, SMDS, X.25 and ISDN. Long delay or travel times for packets tend to indicate an inefficient route, problems in the network, or other deficiencies which must be addressed to improve performance. Measurement of delay or travel time is conventionally accomplished by sending protocol specific packets to certain destinations capable of recognizing those packets, and then generating and transmitting a response back to the originator. The round-trip delay or travel time is measured as the absolute time from generation of the protocol specific packet to receipt of the response.

Prior art measurement of delay or travel time through communications networks suffers from major disadvantages. In particular, the measured delay or travel times include the processing delay introduced by recognition of the protocol specific packet and subsequent generation of the response. The protocol specific packets increase traffic on the network, thereby adding to the effective delay or travel time in the system. Further, delay or travel time measurements may only be made when the available protocols and equipment are capable of supporting responses to certain protocol specific packets.

OBJECTS AND SUMMARY OF THE INVENTION

Accordingly, it is an object of the present invention to provide a method and apparatus for measuring the round-trip delay or travel time in a communications network without taking the communications network out of service, and excluding variable delays imposed by protocol processing at the end points.

It is another object of the present invention to provide a method and apparatus for measuring the round-trip delay or travel time in a communications network without requiring measurement-specific data but instead processing the actual data stream that happens to be transmitted in the network, regardless of the protocol.

According to the present invention, probes are situated at monitor points of interest in a communications network. Typically, although not necessarily, the probes are located at actual target sites of the network. During normal in-service operation, identifiable data patterns are sent between sites, traversing the monitor points. Each probe captures identifiable data patterns arriving at and departing its respective monitor point, and generates a time stamp indicating the time of the arrival or departure. The probe also generates a pattern identifier derived from the data in the identifiable data pattern to uniquely identify that identifiable data pattern, and stores the time stamp and corresponding pattern identifier in an internal buffer. Once the internal buffers contain a predetermined number (preferably user-specified) of identifiable data patterns, the pattern identifiers collected in the buffers of the two probes are matched by a processor to coordinate arrival and departure times of each identifiable data pattern. If fewer matches than a predetermined number of matches are found, the measurement of the round-trip delay or travel time fails. If the number of matches found equals or exceeds the predetermined number, the processor calculates an average round-trip delay or travel time based on the arrival and departure times of identifiable data patterns traveling in both directions between monitor points.

The above and still further objects, features and advantages of the present invention will become apparent upon consideration of the following detailed description of a specific embodiment thereof, particularly when taken in conjunction with accompanying drawings wherein like references in the various figures are utilized to designate like components.

DESCRIPTION OF THE PREFERRED EMBODIMENTS

Figure 1:
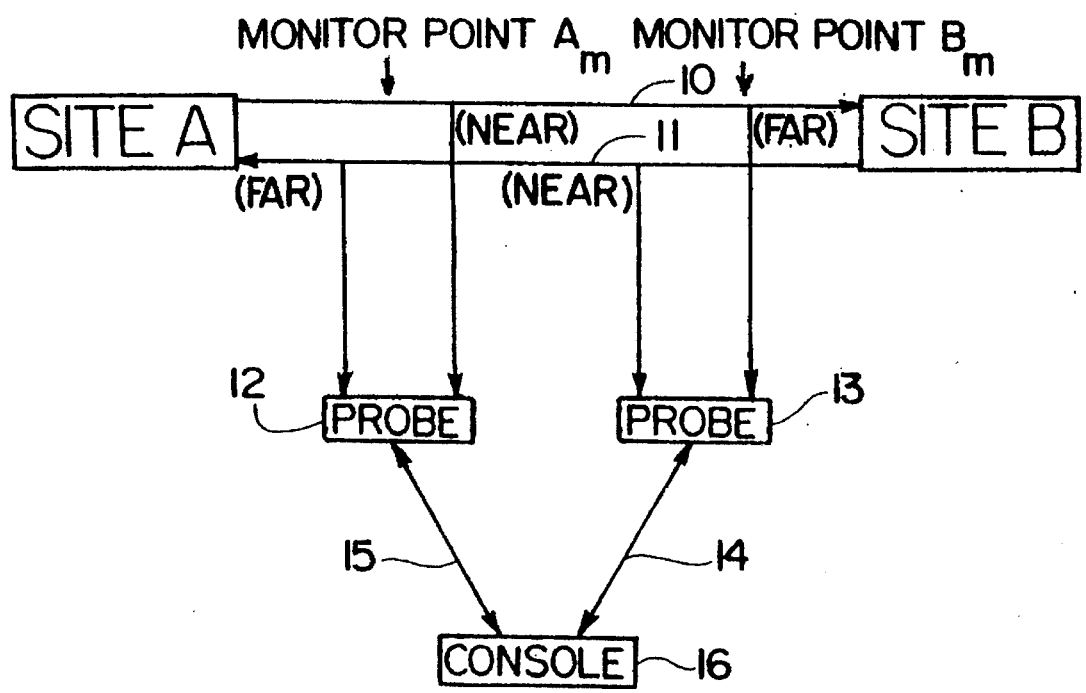
FIG. 1 is a block diagram of a system for measuring the round-trip delay or travel time according to the present invention.

Referring to the system illustrated in FIG. 1, two sites (A and B) are connected in a packetized data communications network by communication lines 10, 11. The preferred embodiment utilizes a packetized data communications network, however the present invention is applicable to any communications network where the data contains identifiable patterns and is not altered by the network. Each site is capable of both transmitting and receiving data packets conforming to whatever data protocol maybe employed in the network. Each communication line 10, 11 represents a respective transmission direction as indicated by the arrows. Two probes 12, 13 are each connected to both communication lines 10, 11 at respective monitoring points $A_m$, $B_m$ to capture and process data packets being sent between sites A and B. The far sides of the respective probes 12 and 13 capture data packets arriving at the probe, while the near sides capture data packets departing from the respective probes 12 and 13. The terms "arriving" and "departing" are employed to imply transmission direction and are truly accurate only in the typical case where probes 12, 13 are situated at the actual sites A and B. However, the probes may be situated at any points in between to measure the round-trip delay or travel time between those points. When probes 12, 13 have captured a user-specified amount of data, the processed data is then transmitted over secondary communication paths 14, 15 to a console 16 which internally stores and analyzes the processed data to produce the round-trip delay or travel time measurement. Typically, console 16 is a conventional personal computer or other general purpose computer and may be situated at any location having a communication capability with the probes.

Figure 2:
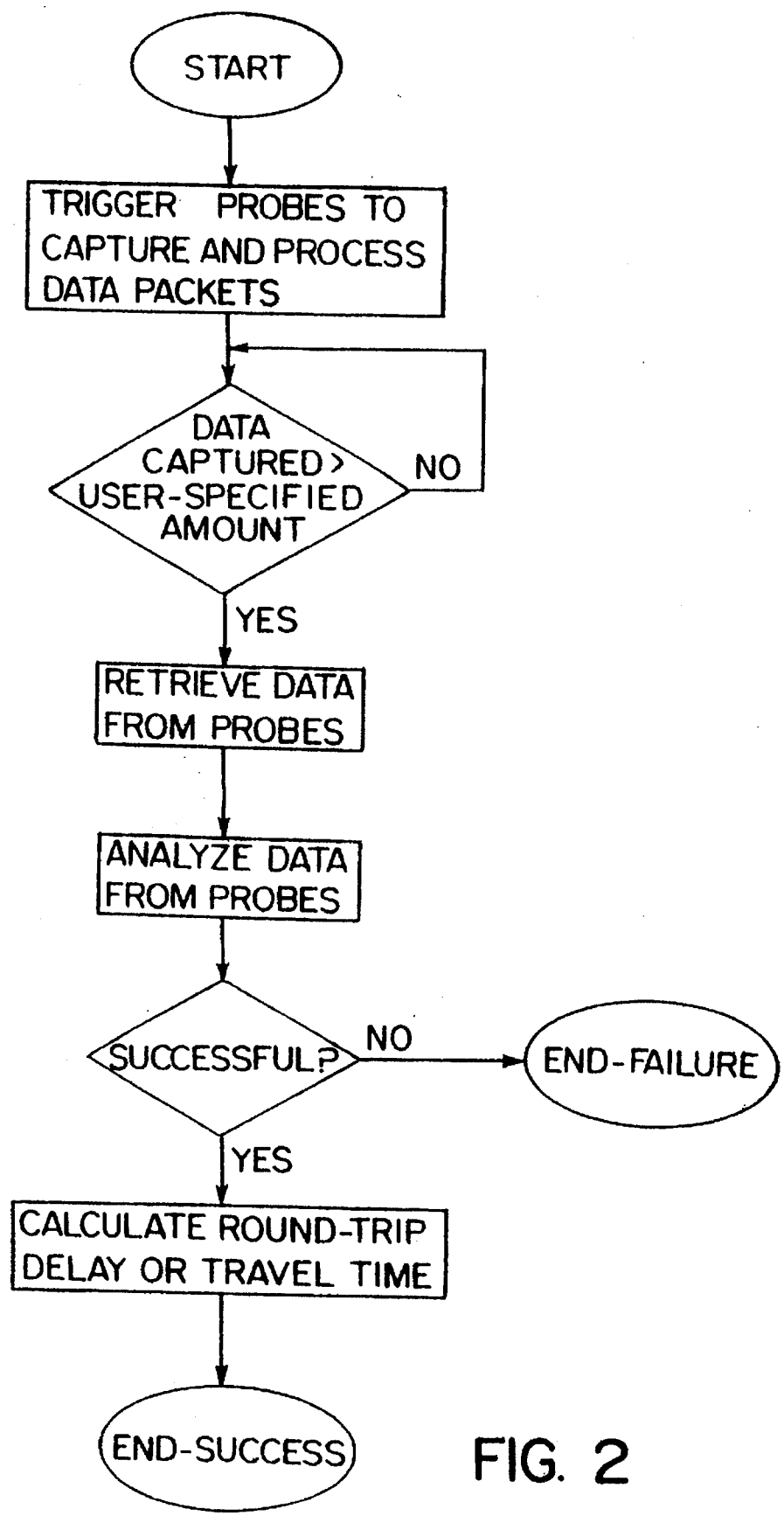
FIG. 2 is a software flow chart for controlling measurement of round-trip delay or travel time according to the present invention.

The operation of the overall system is described with reference to FIGS. 1 and 2. A system operator requests console 16 to perform a round-trip delay or travel time measurement. The console configures and triggers probes 12, 13 to start capturing and processing data. Console 16 then polls probes 12, 13 to determine if a predetermined (typically user-specified) amount of data has been captured by each probe. If the predetermined amount of data has been captured by both probes, the processed data is transmitted via paths 14, 15 and internally stored in console 16. Console 16 analyzes the received data to determine whether the data is capable of producing an accurate measurement as described below. If the received data is capable of producing an accurate measurement, console 16 calculates the round-trip delay or travel time.

Figure 3:
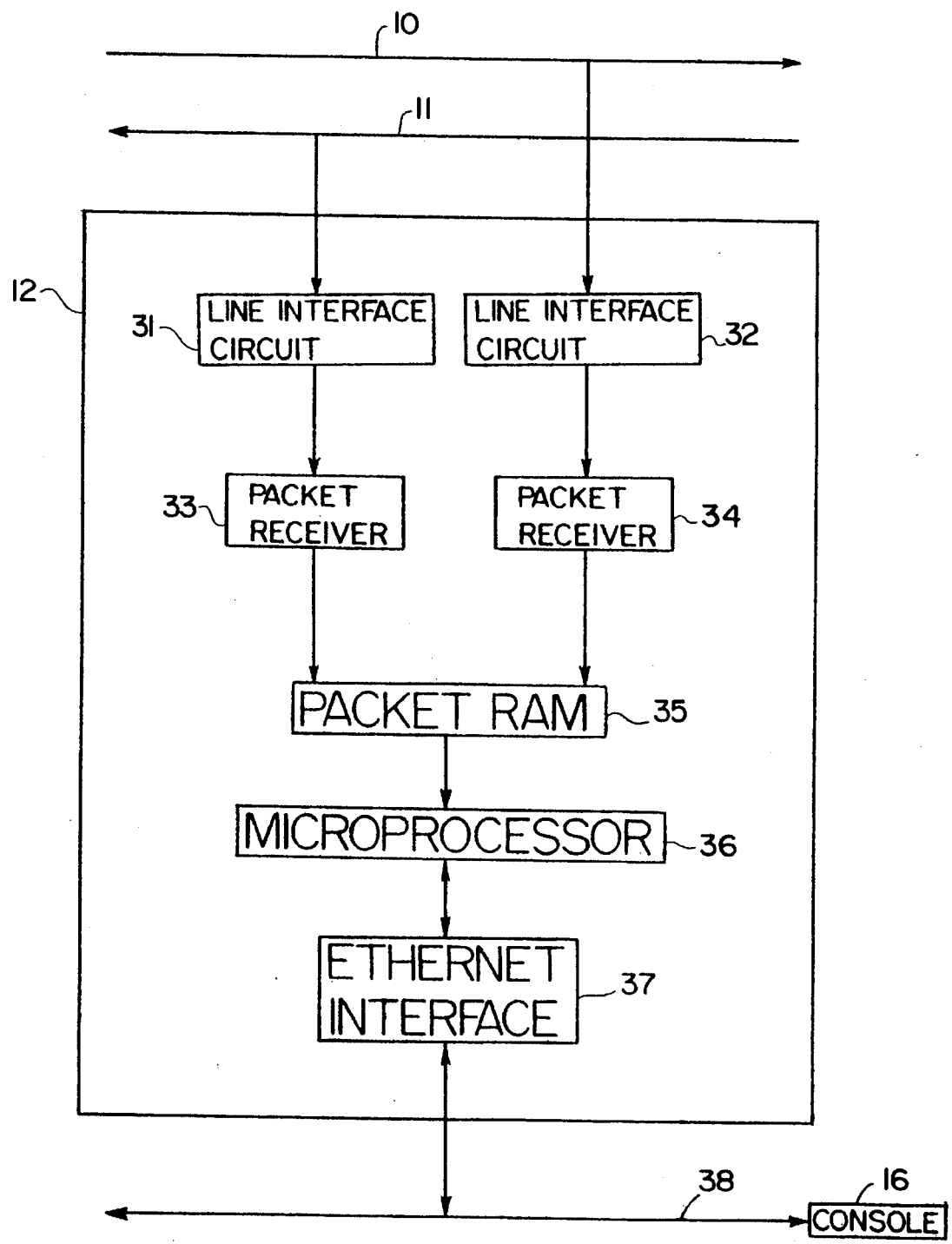
FIG. 3 is a functional block diagram of a probe employed in the system of FIG. 1.

Referring to FIG. 3, probes 12, 13 are shown in block diagram form. Specifically, signals from communication lines 10, 11 are received at probe 12, for example. The signals are applied directly to respective line interface circuits 31, 32 that function to adapt the signals to standard digital logic levels used by respective packet receivers 33, 34. The packet receivers identify individual data packets within a data stream and store copies of the packets in a packet RAM 35. Packet RAM 35 is coupled to and shared by microprocessor 36 which processes the packet and generates corresponding time stamps and data packet identifiers in the manner described below. In parallel to these operations, microprocessor 36 responds to requests from console 16.

Figure 4:
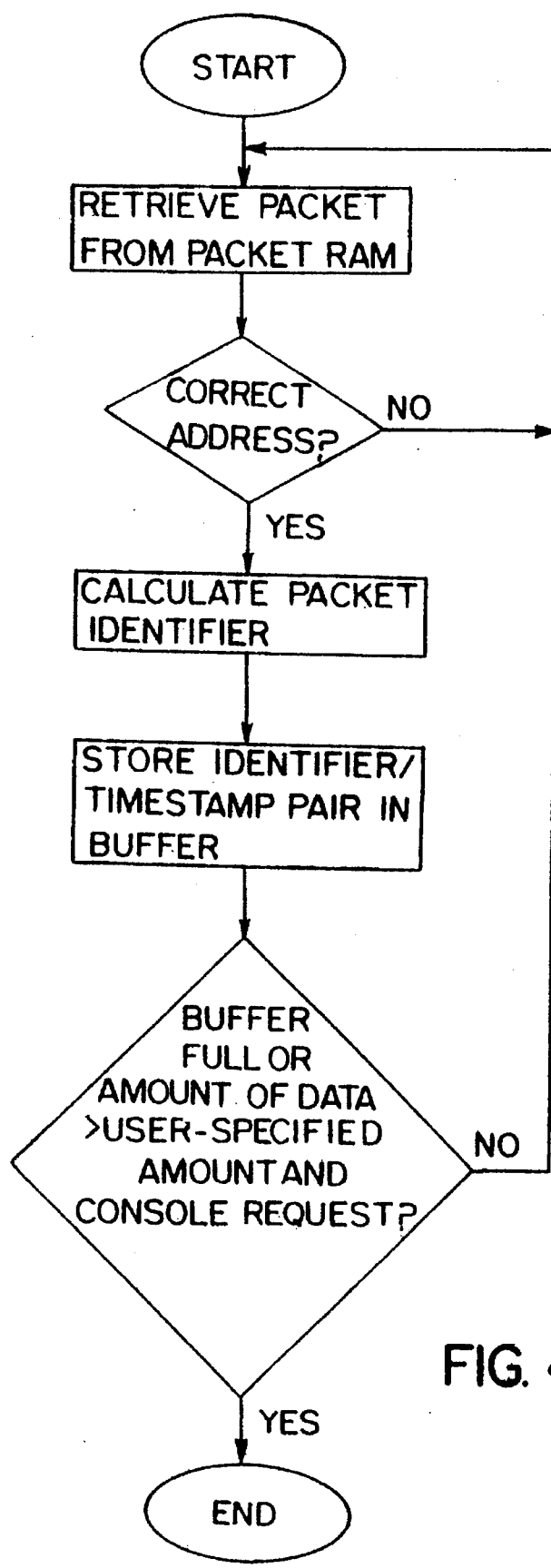
FIG. 4 is a software flow chart illustrating the operation of the probe of FIG. 3.

Processing of the received data by microprocessor 36 is described in relation to FIGS. 3 and 4. Specifically, microprocessor 36 retrieves each data packet from packet RAM 35 and compares the transmission destination address for the packet with an address established as a parameter when console 16 configures the probes in response to a user request for a time delay measurement. If the transmission destination address of the retrieved packet matches the parameter address, the packet is determined to be part of the data traversing the monitoring points for which measurement is desired, and a timestamp and packet identifier are generated and stored in a table in a buffer internal to the microprocessor 36. Packets with transmission destination addresses not matching the parameter address are ignored. The format of tables stored in the internal buffer of microprocessor 36 is illustrated in Table I. The tables comprise two columns representing the packet identifiers and timestamps.

Each individual table in Table I contains packets received exclusively on one of the near or far lines of the probe (FIG. 1). In the preferred embodiment, each probe contains a single table, typically holding two hundred entries, where the most significant bit of the packet identifier indicates the side on which the packet is received as described below. The process continues until console 16 requests the data of the buffers in the probe when the total number of datum exceeds a predetermined number. The process may also terminate when the buffer is full and console 16 does not request data.

Microprocessor 36 generates a time stamp by maintaining and sampling a 32 bit free-running counter clocked by 1 KHz pulses derived from the microprocessor 24.704 MHz crystal oscillator. The counter has a one millisecond resolution and has a sufficiently large capacity that rollover infrequently occurs. The counters of each probe need not be synchronized, but they must be clocked at substantially identical rates to assure measurement accuracy.

In the preferred embodiment, the packet identifiers generated by microprocessor 36 (FIG. 3) comprise packet signatures. The signature for a packet is created by utilizing the data in that packet. Specifically, a user-specified number of bytes of data at the beginning of the packet are omitted while the remainder of the packet is treated as an array of 32-bit unsigned integers (i.e., the most significant bit is treated as part of the integer and does not designate the sign of the integer). The user-specified number of bytes are set as a parameter during configuration of the probes by console 16 (FIG. 3). The omitted bytes at the beginning of the packet are omitted in order to avoid inconsistent signatures due to modification of packet data by transmission systems during transmission. The signature is obtained by adding the 32-bit unsigned integers together, ignoring overflow, with any remaining bytes left over in the packet. The packet length may be added to this sum to generate unique signatures if the packets contain mostly zeros. The packet length is treated as an unsigned 16-bit integer. The most significant bit of the signature is set to one to indicate the packet was retrieved from the near side of the probe, and set to zero to indicate retrieval from the far side.

The unique identifier for the packet is generated in order to later coordinate packet arrival and departure times. When console 16 requests data, the data in the buffer of the probe is released to ethernet interface 37 to make the data compatible for transfer over ethernet bus 38 to console 16 for processing.

The above-described components 31–37 of probes 12, 13 are all conventional and commercially available. The preferred embodiment utilizes the following integrated circuits with corresponding circuitry: Level One LXT901PC as

TABLE I

| Probe 12 Near Table | | Probe 13 Far Table | | Probe 13 Near Table | | Probe 12 Far Table | |
|---|---|---|---|---|---|---|---|
| Identifier/ Signature | Timestamp | Identifier/ Signature | Timestamp | Identifier/ Signature | Timestamp | Identifier/ Signature | Timestamp |
| F3681292 | 00000012 | 73681292 | 10102276 | A6288DE2 | 10102277 | 26288DE2 | 00000014 |
| E371A533 | 00000016 | 6371A533 | 10102280 | 8EF1234A | 10102280 | 0EF1234A | 00000017 |
| 8E9BC998 | 00000021 | 0E9BC998 | 10102285 | 954861AE | 10102285 | 154861AE | 00000022 |
| AA7F2900 | 00000022 | 2A7F2900 | 10102286 | A6481252 | 10102286 | 26481252 | 00000023 |
| 9AD34288 | 00000025 | 1AD34288 | 10102289 | E72A2DEE | 10102290 | 672A2DEE | 00000027 |
| F6DA0124 | 00000029 | 76DA0124 | 10102293 | | | | |

Ethernet Interface 37; Motorola MC(XC) 68EN360RC25-60 as Microprocessor 36; Texas Instruments TM124BBK32-60 or equivalent DRAM SIMM as Packet RAM 35; portions of the above-mentioned Motorola MC(XC) 68EN360RC25-60 as Packet Receivers 33, 34; Advanced Micro Devices AM26LS32PC or equivalent line receivers as Line Interface Circuits 31, 32.

The preferred embodiment utilizes probes attached to communications networks of either North American T1 (1.544 Mbits/second) or CCITT v.35 (variable rate). Packets contain a protocol known as Frame Relay wherein each packet has an address corresponding to its ultimate destination. Packet switches forward each packet according to the address, and as data streams are likely to contain packets for different destinations, the present invention, as described above, filters the packets based on their destination addresses. This filtering allows for measurement of round-trip delay or travel time on virtual circuits (different packet destinations on a single line) as well as physical circuits (single packet destination on a single line).

Figure 5:
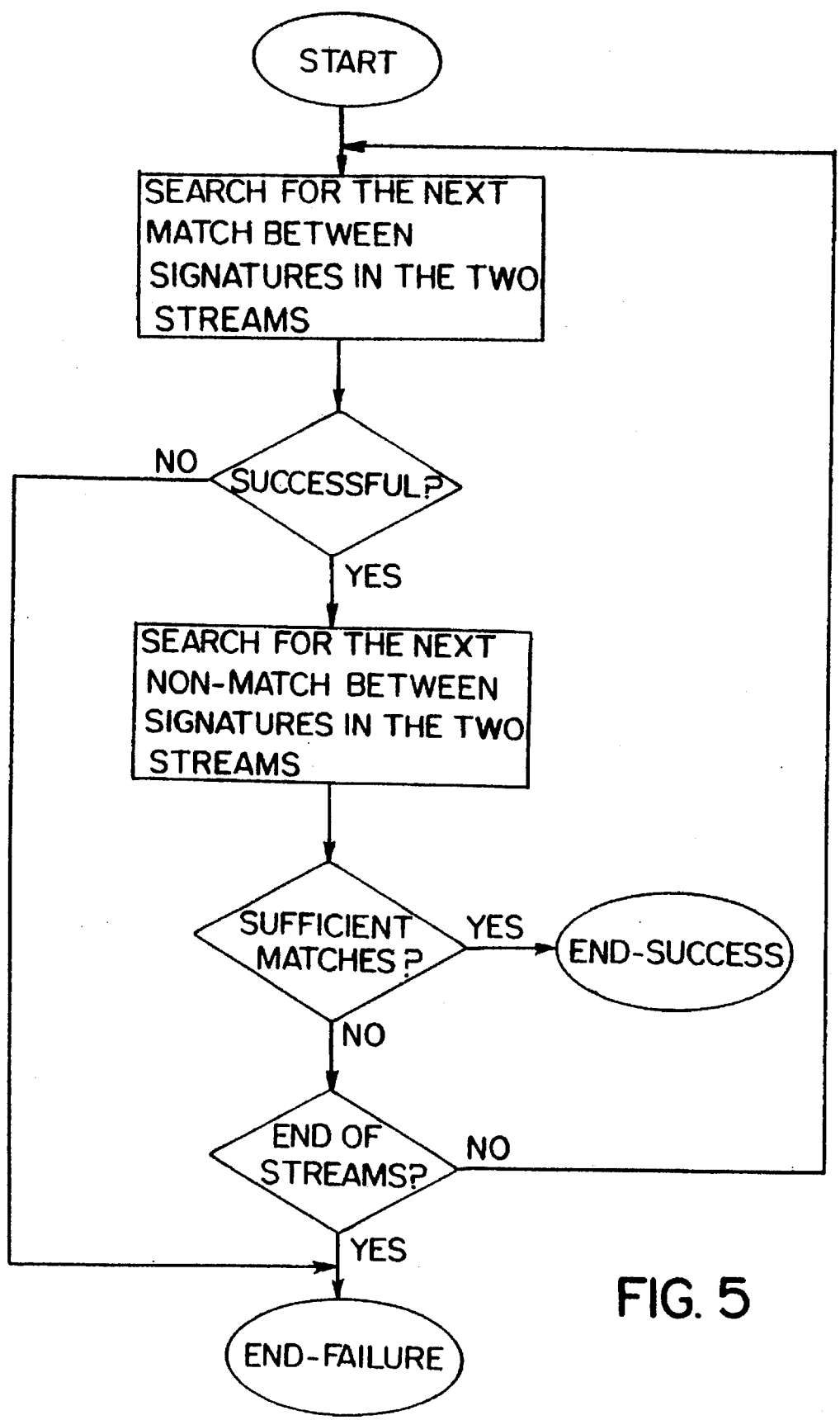
FIG. 5 is a software flow chart illustrating the process for coordinating arrival and departure times in the system of FIG. 1.

The procedure for coordinating the arrival and departure times of each packet is described with reference to FIGS. 1 and 5. After the probes 12, 13 collect data in their respective buffers, the collected data is sent to console 16 for processing. The data is made up of each packet's unique identifier and corresponding time stamp. Console 16 separates the data into tables corresponding to the near and far sides of the probes 12, 13 based on the most significant bit of the packet identifier. The most significant bit of the packet identifier is masked off in order that packet identifiers of near and far sides coincide for matching. Console 16 then searches for matches of unique identifiers. Specifically, the table containing data from the near side of probe 12 is compared with the table containing data from the far side of probe 13. Conversely, the table containing data from near side of probe 13 is compared with the table containing data from the far side of probe 12. The reason for the specific table comparisons is that when a packet is sent from site A to site B, the packet traverses the near side of probe 12, and an identifier and time stamp indicating the time the packet departed from probe 12 is stored. Probe 13 later receives the same packet on its far side and the unique identifier and a time stamp indicating the arrival time is stored. Therefore, matching of the unique identifiers gives the packet's departure and arrival times at the monitoring points. A similar procedure occurs when different packets are being sent from site B to site A. The data packets are transmitted independently and asynchronously at each site, the probes simply receive and collect the data as it is transmitted.

Table II illustrates example tables showing packet identifiers in order to demonstrate the coordination procedure.

Console 16 begins the coordination of arrival and departure times by searching for a first match between packet identifiers in a corresponding pair of tables (i.e., near side of probe 12 with far side of probe 13, or near side of 13 with far side of 12). If no match is found, the round-trip delay or travel time measurement fails. If matches are found, console 16 continues to search for matches. When console 16 encounters a non-matching entry in the corresponding pair of tables, the console 16 compares the number of matches to a predetermined threshold number. The threshold is set large enough to avoid the danger of erroneous measurements due to misalignment of time stamps with corresponding packets. As the number of matches increases, the greater is the reliability of and the confidence in the result. The value of the threshold is typically specified by the system user and adjusted based on empirically encountered difficulties. Typically, a default value of ten is set. After each comparison against the threshold, if the matches do not exceed the threshold, a search for the next match commences. If the capacity of the tables is exceeded before a sufficient number of matches is found, the round-trip delay or travel time measurement fails. Insufficient matches are generally attributed to one or more of the following causes: probe storage being insufficient to store enough entries to account for the round-trip delay present on the circuit plus the difference in time between the two probes being triggered to begin storing entries; high error rates due to erroneous or dropped packets; the threshold for the number of required matches is too great considering any erroneous or dropped packets and the storage available on the probe; not properly ignoring modified sections of the packet in calculation of the signature; or improper attachment of the probes to the network. The matching process is conducted for each of the corresponding pairs of tables. If the number of matches between each pair of tables exceeds the threshold, the round-trip delay or travel time is calculated in the manner described in relation to FIG. 6.

Figure 6:
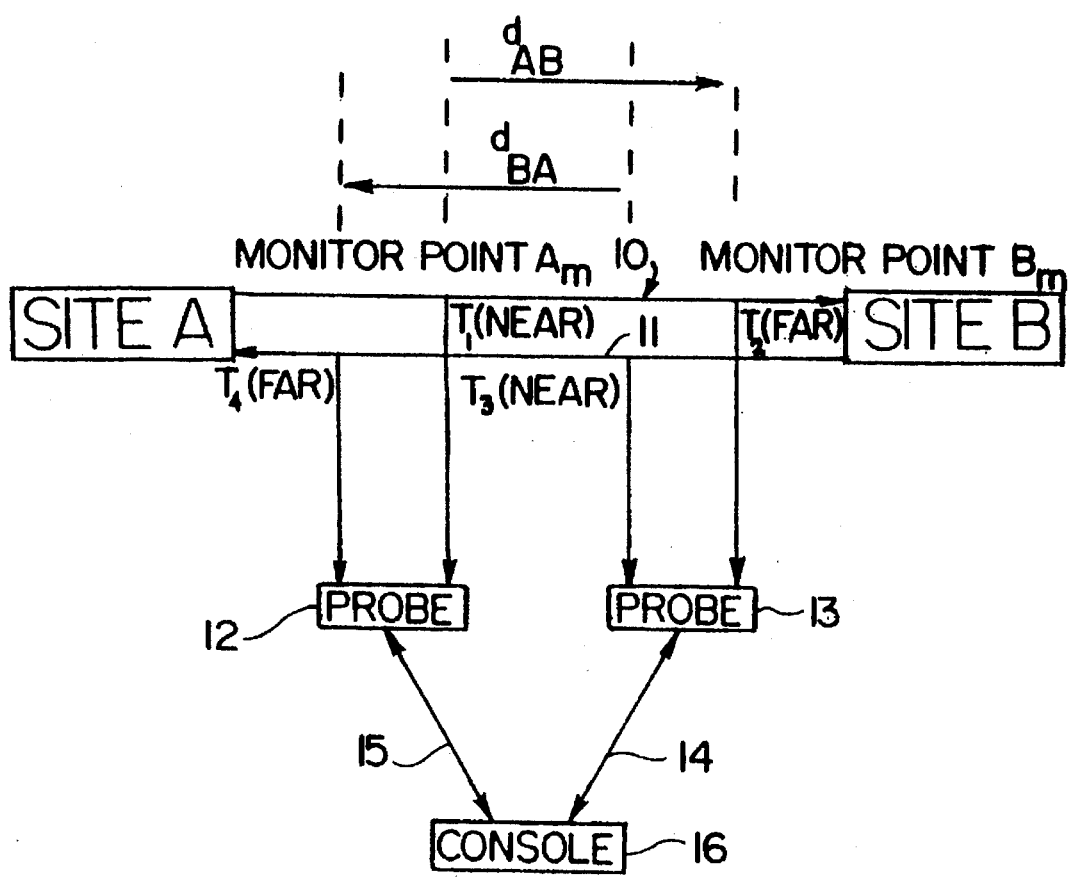
FIG. 6 is a functional block diagram of the system of FIG. 1, further illustrating time stamp generation.

FIG. 6 illustrates the system of FIG. 1 and additionally shows the time stamps of respective packets. Console 16, after determining matches, uses the arrival and departure time stamps of packets to calculate the round-trip delay or travel time. Specifically, $d_{AB}$ represents a delay in traveling from monitor point $A_m$ to monitor point $B_m$; $d_{BA}$ represents a delay in traveling from monitor point $B_m$ to monitor point $A_m$; $T_1$ represents the departure time stamp from monitor point $A_m$; $T_2$ represents the arrival time stamp at monitor point $B_m$; $T_3$ represents the departure time stamp from monitor point $B_m$; and $T_4$ represents the arrival time stamp at monitor point $A_m$. Since the free-running counters of probes 12, 13 may not have started at the same time, $\Delta S$ represents this difference in start times between the probe at $B_m$ versus the probe at $A_m$. The round-trip delay or travel

|  | $A_m \rightarrow B_m$ | | | | $B_m \rightarrow A_m$ | | |
|---|---|---|---|---|---|---|---|
|  | Probe 12 Near Identifier/ Signature | Probe 13 Far Identifier/ Signature | | | Probe 13 Near Identifier/ Signature | Probe 12 Far Identifier/ Signature | |
| Match→ | 73681292 | 03287321 | | Match→ | 26288DE2 | 73EF2388 | |
|  | 6371A533 | 73681292 | ←Match | | 0EF1234A | 5522D37A | |
|  | 0E9BC998 | 6371A533 | | | 154861AE | 2628ME2 | ←Match |
|  | 2A7F2900 | 0E9BC998 | | | 26481252 | 0EF1234A | |
|  | 1AD34288 | 2A7F2900 | | | 672A2DEE | 154861AE | |
|  | 76DA0124 | 1AD34288 | | | 036AD342 | 26481252 | |
|  | 0EA67772 | 76DA0124 | | | 13454928 | 672A2DEE | | time r is the time for a packet or frame to travel from monitor point $A_m$ to monitor point $B_m$ and from monitor point $B_m$ back to monitor point $A_m$, or:

$$r = d_{AB} + d_{BA}. \quad (1)$$

The arrival time stamp $T_2$ at monitor point $B_m$ is equal to the departure time $T_1$ from monitor point $A_m$, plus the offset $\Delta S$ in time stamps between the probes, plus the delay or travel time $d_{AB}$ to get to monitor point $B_m$, or:

$$T_2 = T_1 + \Delta S + d_{AB}. \quad (2)$$

The arrival time stamp $T_4$ at monitor point $A_m$, is similarly equal to the departure time stamp $T_3$ from monitor point $B_m$, minus the offset $\Delta S$ between the time stamps, plus the time of travel $d_{BA}$ from monitor point $B_m$ to monitor point $A_m$, or:

$$T_4 = T_3 - \Delta S + d_{BA}. \quad (3)$$

Solving for the offset in time stamps $\Delta S$ in equation (3) yields:

$$\Delta S = T_3 - T_4 + d_{BA}. \quad (4)$$

Substituting $\Delta S$ from equation (4) into equation (2) yields:

$$T_2 = T_1 + (T_3 - T_4 + d_{BA}) + d_{AB}. \quad (5)$$

Since from equation (1), $r = d_{AB} + d_{BA}$, equation (5) is simplified to:

$$T_2 = T_1 + T_3 - T_4 + r. \quad (6)$$

Solving equation (6) for r yields the round-trip delay or travel time:

$$r = T_2 - T_1 - T_3 + T_4. \quad (7)$$

As shown above, the round-trip delay or travel time is a function of the four time stamps collected by probes 12, 13. The offset $\Delta S$ has been removed by the foregoing mathematical manipulation, and the result is the addition of the delays of each direction calculated from the difference in arrival and departure timestamps between the monitoring points ($r = (T_2 - T_1) + (T_4 - T_3)$). After matching, time stamps $T_1$ and $T_2$ are paired, as are time stamps $T_3$ and $T_4$. These time stamps are paired since $T_1$ and $T_2$ relate to a single packet traveling from monitor point $A_m$ to monitor point $B_m$, while $T_3$ and $T_4$ relate to a single packet traveling from monitor point $B_m$ to monitor point $A_m$. Console 16 calculates the round-trip delay or travel time for each set of four time stamps present after matching. All of the calculated round-trip delay or travel times are averaged to arrive at a final measurement. The final measurement is generally in milliseconds, however the unit of measure is dependent upon the time bases of the time stamp counters and the length of the delay. The final measurement in the appropriate units is obtained by multiplying the final average by the amount of time represented by one count of the time base.

It will be appreciated that the embodiments described above and illustrated in the drawings represent only a few of the many ways of utilizing the principles of the present invention to measure round-trip delay or travel time in a communication network.

The principles of the present invention may be applied not only to packetized communications networks (e.g. Frame Relay, SMDS, ATM, etc.), but also to any communications network wherein the data transmitted and received is substantially unaltered by the communications network itself and contains identifiable patterns (e.g. framing bits, synchronization of words or other unique data patterns) in the data that permit the identification of unique portions of the data stream. Thus the principles of the present invention could be applied, for example, to measure the round-trip delay or travel time in a TDMA network, secure communications network, or a non-packetized leased-line network.

The console described above is not limited to a personal computer, but may be replaced by a microprocessor, general circuitry, combinational logic or any other means capable of performing comparisons and basic mathematical functions.

Communications between the console and the probes may be alternatively accomplished by busses, voice grade modems, the packetized data communications network being monitored, radio, or any other means suitable for transporting data.

The time stamp base may be accomplished by any known oscillator or clock capable of generating pulses at distinct time intervals.

The present invention may also be utilized to calculate one-way delay or travel time between points of interest by halving the final measurement of the round-trip delay or travel time.

The average computation of measurements in the present invention may be implemented by any alternative computations capable of arriving at an average. For example, the present invention may calculate an average delay of each direction by subtracting the timestamps at the monitor points of a packet traveling in a particular direction and averaging the individual timestamp differences. The average delay of each direction may then be added to arrive at the final average measurement.

Although the preferred embodiment discloses a particular structure of the probes, any data gathering devices capable of capturing and recording the time of data reception and transmission can be used according to the principles of the present invention. Further, the present invention is not limited to signatures as identifiers, but rather any method of uniquely identifying data patterns (e.g. special headers, coding/encryption, etc.) may be implemented according to the present invention.

From the foregoing description it will be appreciated that the invention makes available a novel method and apparatus for measuring the round-trip delay or travel time in communications networks during in-service operation by employing probes to capture departure and arrival times of identifiable data patterns between points of interest, and matching the times to respective identifiable data patterns in order to compute the round-trip delay or travel time.

Having described preferred embodiments of the new method and apparatus for measuring round-trip delay or travel time in communications networks during in-service operation it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. Apparatus for measuring round-trip delay time of identifiable data patterns traversing a plurality of points in a communication network by monitoring identifiable data patterns traversing said network during in-service operation, said apparatus comprising:

first probe means, coupled to communication lines of said communication network and situated at a first point, for receiving identifiable data patterns representing information transmitted on said network, said first probe means comprising:

first time stamp means for generating a first probe time stamp representing a time at which each identifiable data pattern is received by said first probe means;

first identifier means for generating a pattern identifier for said each received identifiable data pattern based on data in said each identifiable data pattern; and first buffer means for storing said first probe time stamps and said pattern identifier for each identifiable data pattern received at said first probe means;

second probe means, coupled to said communication lines and situated at a second point, for receiving identifiable data patterns representing information transmitted on said network, said second probe means comprising:

second time stamp means for generating a second probe time stamp representing a time at which each identifiable data pattern is received by said second probe means;

second identifier means for generating a pattern identifier for said each identifiable data pattern received by said second probe means and based on data in that identifiable data pattern; and second buffer means for storing said second probe time stamps and said pattern identifiers for each identifiable data pattern received at said second probe means;

analysis means for analyzing data in said first and second buffer means and generating an analysis result; and result means for determining from said analysis result a round-trip delay time for an identifiable data pattern traversing said first and second points;

wherein said first and second probe means, said analysis means and said result means collectively determine said round-trip delay time while said communication system is in-service processing identifiable data patterns during normal operating conditions.

2. The apparatus of claim 1 wherein said identifiable data pattern comprises a data packet.

3. The apparatus of claim 1 wherein said first and second identifier means comprise means for manipulating specified bits in received identifiable data patterns in a predetermined manner to derive said pattern identifiers.

4. The apparatus of claim 1 wherein said analysis means comprises means for comparing said pattern identifiers stored in said first buffer means to said pattern identifiers stored in said second buffer means to detect sequences of corresponding identifiable data patterns and their associated time stamps.

5. The apparatus of claim 4 wherein said result means comprises arithmetic means for mathematically combining said associated time stamps to calculate said round-trip delay time.

6. The apparatus of claim 5 wherein said arithmetic means comprises means for mathematically combining said time stamps of said associated time stamp pairs according to a relationship:

$$r = T_2 - T_1 - T_3 + T_4$$

where r is said round-trip delay time, $T_1$ is a time stamp for each identifiable data pattern received at said first point from a first transmission direction, $T_2$ is a time stamp for said each identifiable data pattern received at said second point from said first transmission direction, $T_3$ is a time stamp for each identifiable data pattern received at said second point from a second transmission direction, and $T_4$ is a time stamp for each identifiable data pattern received at said first point from said second transmission direction.

7. In a data communication network, a method for measuring transmission delay time of identifiable data patterns traversing the network past first and second monitor points, said method comprising the steps of:

(a) receiving identifiable data patterns at said first and second monitor points during in-service operation, of said communication system;

(b) generating a time stamp for each received identifiable data patterns signifying a time of reception of that identifiable data pattern;

(c) generating pattern identifiers from respective data in said received identifiable data patterns;

(d) storing said time stamps and pattern identifiers for each received identifiable data pattern;

(e) comparing said stored pattern identifiers and indicating a match when the same identifier is found to have been generated for an identifiable data pattern received at both said first and second monitor points; and (f) determining the time difference between time stamps for each matched identifier;

wherein said steps (a)–(f) collectively determine the transmission delay time between said first and second monitor points while said communication system is in-service processing said identifiable data patterns during normal operating conditions.

8. The method of claim 7 further comprising the step of:

(g) determining the round-trip transmission delay time between said first and second monitor points by adding:
  (i) the time difference determined in step (f) for at least one identifiable data pattern received at said first monitor point earlier than at said second monitor point, to
  (ii) the time difference determined in step (f) for at least another identifiable data pattern received at said second monitor point earlier than at said first monitor point.

9. The method of claim 7 further comprising the steps of:

(g) locating from said matches a predetermined plurality of identifiable data patterns received at said first monitor point earlier than at said second monitor point;

(h) for the plurality of data points located in step (g), computing an average of the time differences determined in step (f);

(i) locating from said matches a predetermined plurality of identifiable data patterns received at said second monitor point earlier than at said first monitor point;

(j) for the plurality of data points located in step (i), computing an average of the time differences determined in step (f); and (k) determining the round-trip transmission delay between said first and second monitor points by adding the average computed in step (h) to the average computed in step (j).

10. The method of claim 7 wherein said identifiable data pattern comprises a data packet.

11. The method of claim 7 wherein said step (e) comprises matching said pattern identifiers generated at said first monitor point and stored in a first buffer to said pattern identifiers generated at said second monitor point and stored in a second buffer to form sequences of associated time stamp pairs.

12. The method of claim 11 wherein said step (f) comprises mathematically combining time stamps of said associated time stamp pairs to calculate the round-trip transmission delay time between said monitor points.

13. The method of claim 12 wherein said step (f) comprises combining said time stamps of said associated time stamp pairs according to a relationship:

$$r = T_2 - T_1 - T_3 + T_4$$

where r is said round-trip delay time, $T_1$ is a time stamp for each identifiable data pattern received at said first monitor point from a first transmission direction, $T_2$ is a time stamp for said each identifiable data pattern received at said second point from said first transmission direction, $T_3$ is a time stamp for each identifiable data pattern received at said second point from a second transmission direction, and $T_4$ is a time stamp for each identifiable data pattern received at said first point from said second transmission direction.

14. In an identifiable data pattern transmission network of the type wherein information is transmitted in the form of a series of identifiable digital data patterns between two or more spaced locations, apparatus for measuring transmission delay between first and second monitor points in said network using the data patterns transmitted during on-line operation of the network without requiring special test signals to be transmitted on the network or that the network be taken out of service to perform measurements, said apparatus comprising:

first and second probes connected to said network at said first and second monitor points, respectively, for receiving said data patterns as they are transmitted past said first and second monitor points;

wherein each probe includes:

time stamp means for generating a time stamp for each received data pattern representing a time at which that data pattern is received;

identifier means responsive to each received data pattern for generating an identifier code derived as a function of specified bits in said data pattern to uniquely identify said each received data pattern; and a first storage buffer for storing in sequence the time stamp and identifier for data patterns received in said sequence from a first direction along said network;

first comparator means for comparing data pattern identifiers stored in said first storage buffer of said first probe with data pattern identifiers stored in said first storage buffer of said second probe to locate a first direction match signifying the same identifier stored in both probes; and first computing means responsive to each first direction match located by said comparator means for computing a first direction difference between times represented by the time stamps for the matched identifiers, wherein said first direction difference is a measure of transmission delay in said first direction between said monitor points of the data pattern identified by the identifier of said each first direction match.

15. The apparatus of claim 14 wherein said identifiable digital data pattern comprises a data packet.

16. The apparatus of claim 14 wherein said computing means includes means for computing an average of said first direction differences computed in response to a plurality of said located first direction matches, wherein said average of said first direction differences constitutes a measure of the transmission delay time through said network in said first direction between said monitor points.

17. The apparatus of claim 16 further comprising:

a second storage buffer for storing the time stamp and identifier for data patterns received in sequence from a second direction opposite said first direction along said network;

second comparator means for comparing data pattern identifiers stored in said second storage buffer of said first probe with data pattern identifiers stored in said second storage buffer of said second probe to locate a second direction match signifying the same identifier stored in both probes; and second computing means responsive to each second direction match located by said comparator means for computing a second direction difference between times represented by the time stamps for the matched identifiers, wherein said second direction difference is a measure of transmission delay in said second direction between said monitor points of the data packet identified by the identifier of said second direction match.

18. The apparatus of claim 17 wherein said second computing means includes means for computing an average of said second direction differences computed in response to a plurality of said located second direction matches, wherein said average of said second direction differences constitutes a measure of the transmission delay time through said network in said second direction between said monitor points.

19. The apparatus of claim 18 further comprising summing means for adding the average of said first direction differences to the average of said second direction differences to provide a measure of the round-trip transmission delay between monitor points through said network.

20. The apparatus of claim 19 wherein said time stamp means at each probe comprises a source of clock pulses and a counter connected to count said clock pulses, wherein the repetition rate of said clock pulses from said source is substantially identical at each probe, and wherein said sources of clock pulses at said first and second probes are not synchronized in phase to one another.

21. The method of measuring round-trip transmission delay between first and second monitor points in an identifiable data pattern transmission network using identifiable data patterns transmitted during on-line operation of the network, and without requiring special test signals to be transmitted on the network or that the network be taken out of service to perform the measurements, said method comprising the steps of:

(a) measuring the delay between reception of at least one of said identifiable data pattern in the direction from said first monitor point to said second monitor point;

(b) measuring the delay between reception of at least another of said identifiable data patterns in a direction from said second monitor point to said first monitor point; and (c) adding the delays measured in steps (a) and (b).

22. The method of claim 21 wherein step (a) includes the steps of:

(a.1) detecting that said at least one identifiable data pattern has been received at both said first and second monitor points;

(a.2) determining times of reception of said at least one identifiable data pattern at said first and second monitor points, respectively; and (a.3) subtracting said times of reception, one from the other, as a measure of delay; and wherein step (b) includes the steps of:

(b.1) detecting that said another identifiable data pattern has been received at both said first and second monitor points;

(b.2) determining times of reception of said another identifiable data pattern at said first and second monitor points, respectively; and (b.3) subtracting said times of reception determined in step (b.2), one from the other, as a measure of said round-trip transmission delay.

23. The method of claim 21 wherein (a) includes the step of:

(a.4) measuring the delays between reception of a predetermined plurality of said identifiable data patterns in the direction from said first to said second monitor points, and computing an average value of those delays; wherein step (b) further includes the step of:

(b.4) measuring the delays between reception of a predetermined plurality of said identifiable data patterns in a direction from said second to said first monitor points, and computing an average value of those delays; and wherein step (c) includes the step of adding the average values computed in steps (a.4) and (b.4).

24. The method of claim 21 wherein said identifiable data pattern comprises a data packet.

* * * * *